(No Model.)
E. THOMSON.
DEVICE FOR EXAMINING JEWELS BY ROENTGEN RAYS.
No. 587,883. Patented Aug. 10, 1897.
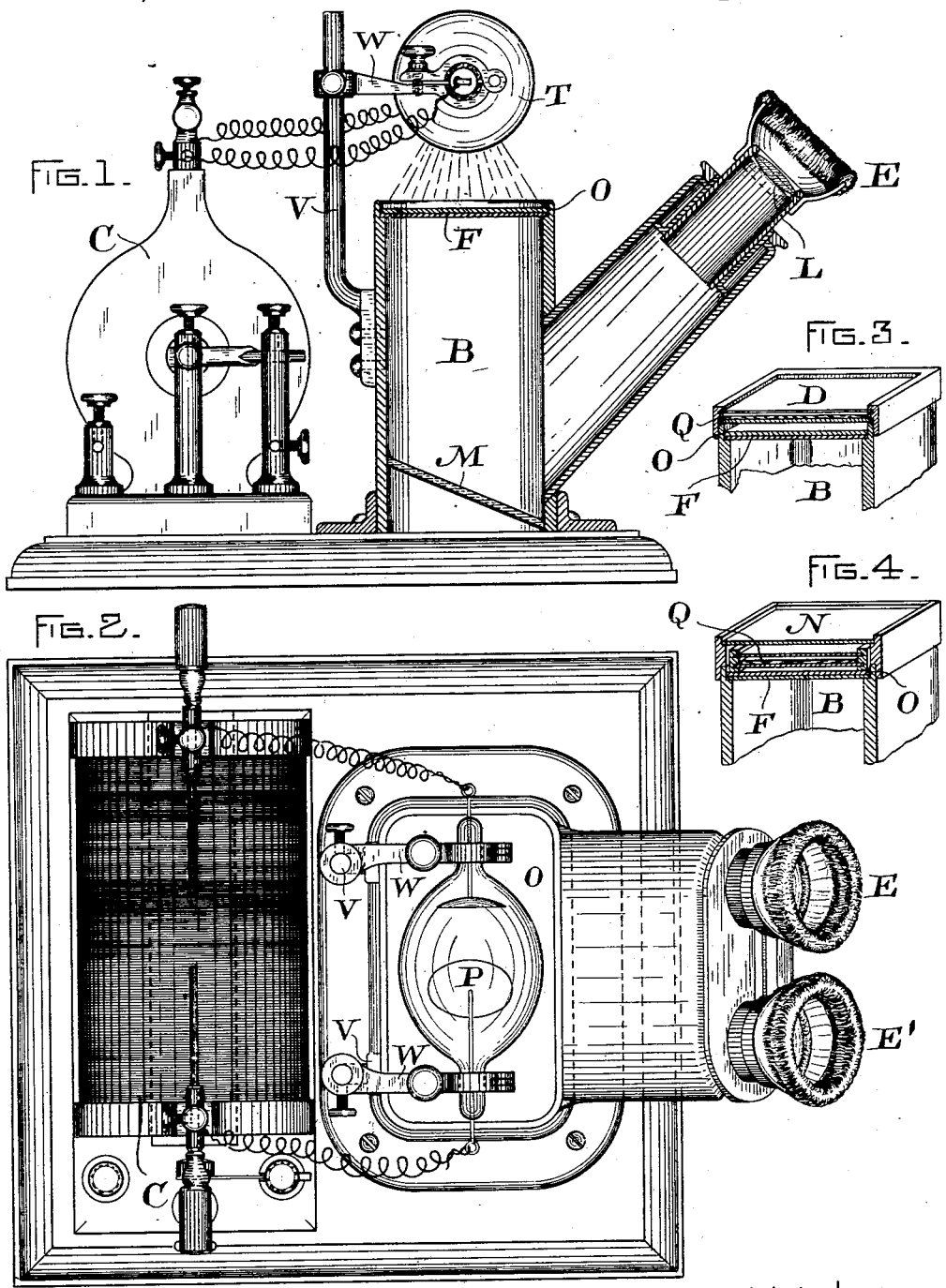

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

DEVICE FOR EXAMINING JEWELS BY ROENTGEN RAYS.

SPECIFICATION forming part of Letters Patent No. 587,883, dated August 10, 1897.

Application filed September 4, 1896. Serial No. 604,849. (No model.)

*To all whom it may concern:*

Be it known that I, ELIHU THOMSON, a citizen of the United States, residing at Swampscott, in the county of Essex, State of Massachusetts, have invented certain new and useful Improvements in Devices for Examining Jewels by Roentgen Rays, (Case No. 435,) of which the following is a specification.

My invention relates to the utilization of Roentgen or X rays in the examination of jewels, to which purpose they are peculiarly adapted, and has for its object to provide a simple and readily-manipulated apparatus for use by jewelers and others who may have occasion to test the genuineness of precious stones.

It is known that diamonds are readily distinguished from "paste" by their transparency to Roentgen rays, which is almost perfect, while paste stones, composed in general of the silicates of heavy metals, are of greater opacity. It is also true that the crystallized alumina, which constitutes the ruby, sapphire, and emerald, is far more transparent than the silicates of the oxids usually employed to imitate them. Hence it is easy to distinguish by Roentgen rays the real jewels.

The accompanying drawings show an embodiment of my invention, Figure 1 being a side elevation, partly in section, of an apparatus constructed according thereto, Fig. 2 being a plan, and Figs. 3 and 4 details.

The present-described apparatus is to facilitate such examinations. It consists, as in Fig. 1, of an ordinary apparatus for producing the proper discharges, such as a Ruhmkorff coil C with its break-piece and other devices for provoking high-potential secondary discharges, which could of course be replaced by high-frequency coils or static machines. The high-potential terminals are connected to the terminals of a standard vacuum-tube T for the production of Roentgen rays. Within this tube are the electrodes, such as concave cathodes with a bombarded piece of platinum P, which is the source of the Roentgen rays. The bombarded face of this piece of platinum P, Fig. 2, is turned down, so that the rays pass out of the tube in that direction, as indicated by the dotted lines, Fig. 1. The rays from the tube T pass downward through a screen O, opaque to light, below which is a fluorescent screen F, coated with barium or potassium platinocyanid or calcium tungstate or other substance excited to fluorescence by Roentgen rays. Below the screen F, and at a little distance therefrom, is a mirror M, placed in the box B at such an angle as to deflect the light through a side tube from the box or chamber. The tube stands at an angle and is provided with eye-openings E E', the instrument being made either monocular or binocular. The eye-openings may be covered either by a piece of plain glass to prevent the entrance of dust into the chamber B or by a lens L, which may be adjusted to the proper focal length with respect to the fluorescent screen F. The eye-openings may be made in the form of sliding tubes adjustable up and down, so as to vary the distance of the eyes or the lens L from the mirror and screen F.

The apparatus as thus made is a convenient simple device for the examination of jewels or jewelry containing precious stones and in general for the examination of minerals as to their opacity. It is only necessary to excite the Crookes tube and place the object upon the opaque screen O in the proper position to see the shadow-image by looking into the tubes E E', it appearing beyond the mirror M as a reflected image. This arrangement is quite similar to the ordinary fluorescent screen in principle, but in construction is far more definite and easy to manipulate. The addition of the mirror and the change of direction of emission of the rays make the instrument as easy to operate as an ordinary table-microscope, and also permits easy adjustment of the focal distance from the screen F to suit difference of effects on different individuals, while the position of the dark chamber B enables me to support objects upon the light-opaque screen O. The screen O is of course made of such material as thin dark leather or black cardboard or very thin aluminium, all of which are fairly transparent to Roentgen rays and quite opaque to light.

At the top of the chamber B is a stand V, consisting of upright rods of wood or metal, preferably insulated from each other, upon which the supports for the Crookes tube T are mounted, so that the latter may be raised or lowered to just those distances from the opaque screen O which are desired. These supports are marked W and consist of ordinary clamping devices for holding the tube T by its extremities.

The apparatus is adapted also to the taking of pictures upon sensitive plates or to the recording of the results of observations upon jewels or other objects. For this purpose a a plate-holder, with plate Q (shown in Fig. 3) in part section, is made to be slipped over the upper part of chamber B without disturbing the fluorescent screen F. In front of the plate-holder may be put a sheet D of any material transparent to Roentgen rays, but opaque to light, such as cardboard or hard rubber. Just below this the sensitive plate, face upward, would lie within the darkened end of the plate-holder, as at Q, and this would be backed by thin hard rubber or good cardboard or the like, also opaque to light. With this arrangement of the plate-holder surmounting the chamber B it is easy to observe (while the photographic impression is being made) the activity of the tube T by looking through the eye-openings E E' and noting the effect on the fluorescent screen. This is particularly the case if the sensitive surface is mounted on a celluloid plate or film instead of on glass or if the glass is thin. The apparent brilliancy or effect on the screen F as observed in this way is an indication of the proper time of exposure to be given in making an image on the sensitive plate, which can be developed in the usual way.

Fig. 4 shows a support N for objects at such a distance above the opaque screen O that the plate-holder may be slipped in under— that is, between the opaque screen O and the support or platform. This is of thin cardboard or of thin wood and carried on pieces extending up around the plate-holder when in place. In this way the objects may be observed in position before inserting the plate-holder, and the fluorescent screen bears the same relation to the plate-holder that the ground glass in the ordinary camera does in enabling one to set the positions of the objects to be depicted before taking the picture.

What I claim as new, and desire to secure by Letters Patent of the United States, is—

1. The apparatus described for facilitating the examination of jewels by Roentgen rays, consisting of means for producing the rays, a support for the jewel opaque to light but transparent to the Roentgen rays, a fluorescent screen for converting the Roentgen rays into light after the passage through the jewel, a mirror for reflecting the rays, and eyepieces for examining the reflected image.

2. In an apparatus for examining jewels, the combination of a source of Roentgen or X rays, a support for the jewel, a fluorescent screen beneath the support, a mirror at an angle beneath the screen, and adjustable eyepieces for observing the reflected image in the mirror.

3. In an apparatus for examining jewels, the combination of a source of Roentgen or X rays, an inclosing box having a fluorescent screen in one side thereof, a support for the object to be examined, the support being opaque to light but transparent to the X-rays, a plate-holder between the object and the fluorescent screen, an inclined mirror in the box, and eyepieces for examining the reflected image in the mirror.

In witness whereof I have hereunto set my hand this 1st day of September, 1896.

ELIHU THOMSON.

Witnesses:
JOHN W. GIBBONEY,
A. F. MACDONALD.